United States Patent
Adari et al.

(10) Patent No.: US 9,665,649 B2
(45) Date of Patent: May 30, 2017

(54) CONTEXTUAL HELP ARTICLE PROVIDER

(71) Applicant: Apollo Education Group, Inc., Phoenix, AZ (US)

(72) Inventors: Murthy Adari, Chandler, AZ (US); Stephen Carroll, Sausalito, CA (US); Debarshi Mukherjee, Chandler, AZ (US); Rahul Parandekar, Chadler, AZ (US)

(73) Assignee: Apollo Education Group, Inc., Phoenix, AZ (US)

( * ) Notice: Subject to any disclaimer, the term of this patent is extended or adjusted under 35 U.S.C. 154(b) by 0 days.

(21) Appl. No.: 14/586,098

(22) Filed: Dec. 30, 2014

(65) Prior Publication Data

US 2015/0134645 A1    May 14, 2015

Related U.S. Application Data

(63) Continuation of application No. 13/679,899, filed on Nov. 16, 2012, now Pat. No. 8,990,190.

(51) Int. Cl.
*G06F 17/30* (2006.01)

(52) U.S. Cl.
CPC .. *G06F 17/30867* (2013.01); *G06F 17/30899* (2013.01)

(58) Field of Classification Search
CPC ......... G06F 17/30864; G06F 17/30905; G06F 17/30749; G06F 17/30761; G06F 17/3087; G06F 17/30867; G06F 17/30672; G06F 17/3089; G06F 17/30637
See application file for complete search history.

(56) References Cited

U.S. PATENT DOCUMENTS

| | | | |
|---|---|---|---|
| 6,947,914 B2 | 9/2005 | Bertrand et al. | |
| 7,630,986 B1* | 12/2009 | Herz | G06Q 10/10 |
| 2004/0078373 A1* | 4/2004 | Ghoneimy | G06Q 99/00 |
| 2004/0230564 A1* | 11/2004 | Simon | G06F 17/30864 |
| 2006/0155764 A1* | 7/2006 | Tao | G06F 17/30867 |
| 2007/0198534 A1* | 8/2007 | Hon | G06F 17/30058 |

(Continued)

OTHER PUBLICATIONS

U.S. Appl. No. 13/679,899, filed Nov. 16, 2012, Notice of Allowance, Oct. 17, 2014.

(Continued)

*Primary Examiner* — Angelica Ruiz
(74) *Attorney, Agent, or Firm* — Hickman Palermo Becker Bingham LLP

(57) ABSTRACT

Techniques are described for displaying help articles, for a web page, that are related to the context of the web page. A help article provider has access to a database of help articles, each of which are associated with target-context data that may include content identifiers for the help article and/or user profile attributes for users that the help article targets. The help article provider identifies content identifiers for a viewed web page based on one or more of: metadata and a URL for the web page. The help article provider searches the help article database using the identified content identifiers. The help article provider may filter the help articles based on an authenticated user's attributes. An ordered list of the identified help articles is displayed, with the most relevant or important help articles displayed at or near the top of the list.

10 Claims, 9 Drawing Sheets

(56) References Cited

U.S. PATENT DOCUMENTS

| | | | |
|---|---|---|---|
| 2008/0229199 A1* | 9/2008 | Richardson | G06F 17/30943 |
| | | | 715/714 |
| 2009/0089678 A1 | 4/2009 | Sacco et al. | |
| 2010/0131896 A1* | 5/2010 | Fitzmaurice | G06T 11/60 |
| | | | 715/811 |
| 2011/0307780 A1 | 12/2011 | Harris et al. | |
| 2012/0072279 A1 | 3/2012 | Agarwal et al. | |
| 2012/0278316 A1 | 11/2012 | Reznik | |
| 2012/0290950 A1* | 11/2012 | Rapaport | H04L 51/32 |
| | | | 715/753 |

OTHER PUBLICATIONS

U.S. Appl. No. 13/679,899, filed Nov. 16, 2012, First Office Action Interview, Apr. 22, 2014.

* cited by examiner

FIG. 2A
FIG. 2B
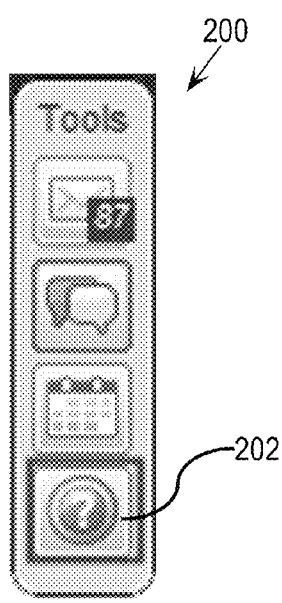
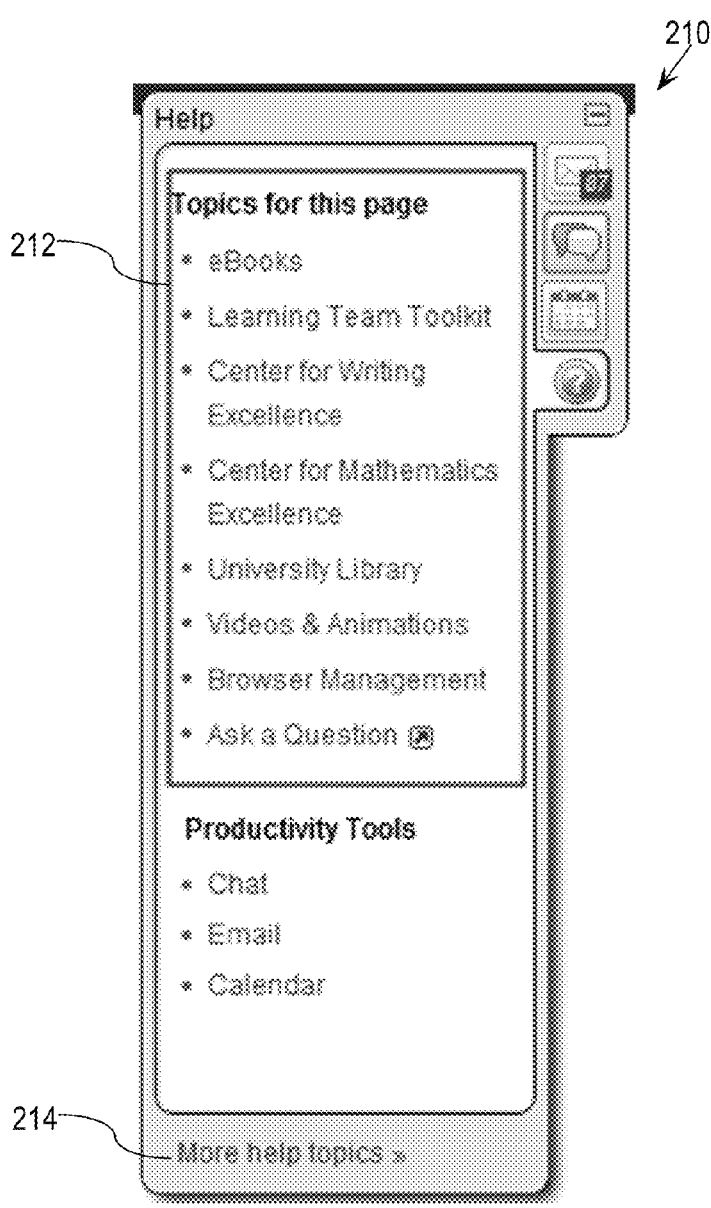

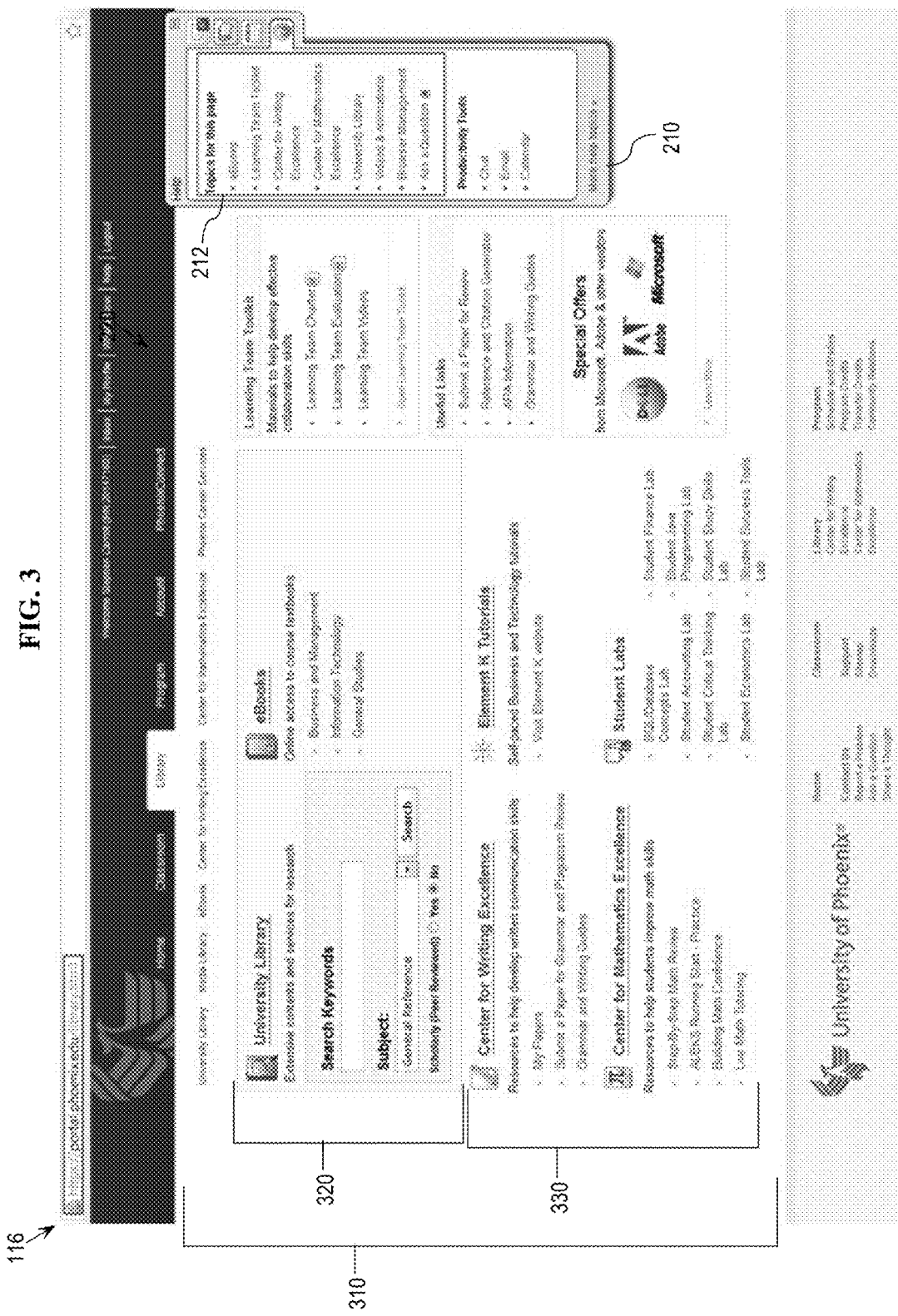

FIG. 4

402 — MAINTAIN MAPPING DATA THAT DEFINES ONE OR MORE MAPPINGS BETWEEN (A) PORTIONS OF LOCATOR STRINGS, AND (B) KEYWORDS; WHEREIN THE ONE OR MORE MAPPINGS INCLUDE A PARTICULAR MAPPING THAT ASSOCIATES AT LEAST A PORTION OF A LOCATOR STRING, FOR A PARTICULAR WEB PAGE, WITH A KEYWORD; AND WHEREIN THE PARTICULAR WEB PAGE IS RELATED TO PARTICULAR SUBJECT MATTER

404 — DETECT OCCURRENCE OF AN EVENT WHILE AT LEAST A PORTION OF THE PARTICULAR WEB PAGE IS BEING DISPLAYED; WHEREIN THE EVENT INDICATES THAT INFORMATION ABOUT HELP ARTICLES SHOULD BE DISPLAYED

406 — DETERMINE, BASED ON THE PARTICULAR MAPPING, THAT AT LEAST A PORTION OF THE LOCATOR STRING FOR THE PARTICULAR WEB PAGE IS MAPPED TO THE KEYWORD

408 — CONSTRUCT A QUERY THAT IS BASED, AT LEAST IN PART, ON THE KEYWORD

410 — EXECUTE THE QUERY AGAINST A DATABASE OF HELP ARTICLES

412 — RECEIVE RESULTS OF THE QUERY

414 — DISPLAY, TO A USER, INFORMATION FOR ONE OR MORE HELP ARTICLES INDICATED IN THE QUERY RESULTS

FIG. 5

| LN | URL |
|---|---|
| LN1 | https://portal.qaols.phoenix.edu |
| LN2 | https://portal.qaols.phoenix.edu/home.html |
| LN3 | https://portal.qaols.phoenix.edu/*/*/program |
| LN4 | https://portal.qaols.phoenix.edu/classroom |
| LN5 | https://portal.qaols.phoenix.edu/home.html?name=Alice&place=Wonderland |

FIG. 6

| | | 630 | 640 |
|---|---|---|---|
| 602 | | https://portal.qaols.phoenix.edu | LN1 |
| 604 | | https://portal.qaols.phoenix.edu?name=Bob | LN1 |
| 606 | | https://portal.qaols.phoenix.edu/home.html | LN2, LN1 |
| 608 | | https://portal.qaols.phoenix.edu/home2.html | LN1 |
| 610 | | https://portal.qaols.phoenix.edu/home.html?name=Bob&place=Wonderland | LN2, LN1 |
| 612 | | https://portal.qaols.phoenix.edu/home.html?name=Alice&place=Wonderland | LN5, LN2, LN1 |
| 614 | | https://portal.qaols.phoenix.edu/home.html?name=Alice&place=Wonderland&type=Book | LN5, LN2, LN1 |
| 616 | | https://portal.qaols.phoenix.edu/357/xbjgsdfashbvjf/program | LN3, LN1 |
| 618 | | https://portal.qaols.phoenix.edu/357/program | LN1 |
| 620 | | https://somedomain.qaols.phoenix.edu/home.html | No Match |

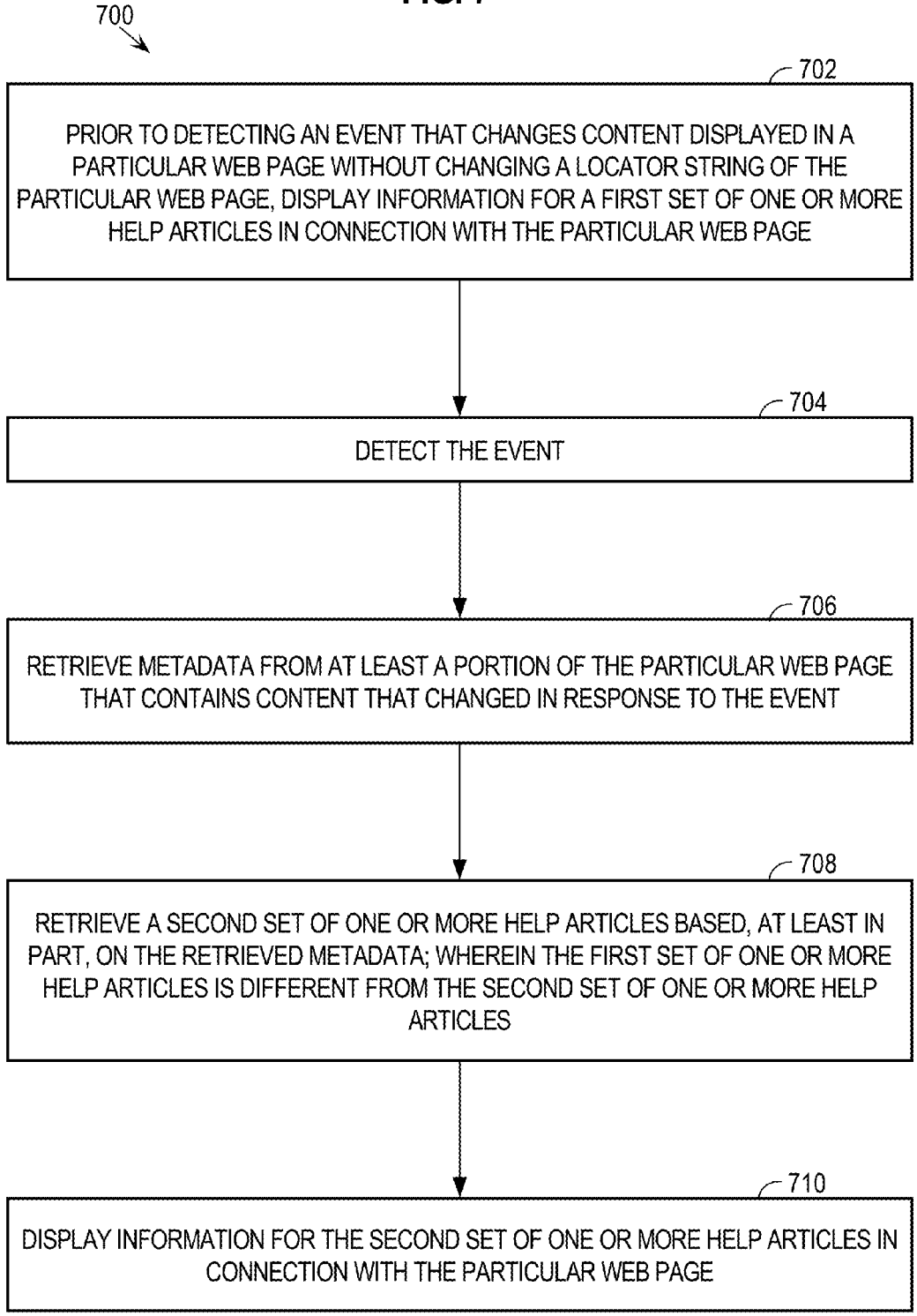

CONTEXTUAL HELP ARTICLE PROVIDER

BENEFIT CLAIM

This application claims the benefit as a Continuation of U.S. patent application Ser. No. 13/679,899 titled CONTEXTUAL HELP ARTICLE PROVIDER, filed Nov. 16, 2012, the contents of which are incorporated by reference in their entirety for all purposes as if fully set forth herein, under 35 U.S.C. §120. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates to making help articles available to users of web pages, and more specifically, to identifying and displaying help articles that are related to the context of the currently-viewed web page.

BACKGROUND

Many times, a provider of web page content will also provide additional resources to help a user to understand aspects of the web content. For example, a help icon may be visually located near an aspect of the web content, and a user may click on or roll over the help icon to access help text that gives details about the web content. Such embedded help text may be displayed in a display element that is part of the web page and/or may overlay the web page content. However, help text that is embedded in such a manner is generally hard-coded into the web page, such that the content provider must edit the web page in order to change the help text. Updating embedded help text can be time-consuming and expensive.

At times, a content provider includes a help link or help icon on a web page, activation of which causes a help resource user interface to be displayed in a new window (e.g., in a new browser window showing a web page that includes information for help resources). The new window is distinct from the window that is currently displaying the web page for which the user is seeking help. Generally, such a help resource user interface organizes the help resources by topic, and the user can browse the help resource topics to identify a help resource that addresses the user's question. Further, such a help resource user interface may include a search mechanism by which the user causes a search for a particular term to be run over the help resources to identify help resources related to the term. However, this kind of presentation of help resources takes the user out of the context of the currently-viewed web page, and it may be cumbersome for the user to effectively find useful help articles.

It would be beneficial to provide a more effective system for allowing users to access help resources, where the system does not take the user out of the context of the currently-viewed web page and that automatically identifies help resources that are associated with the context of the currently-viewed web page.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2C depict graphical user interfaces for displaying help articles identified for the currently-viewed web page.

FIG. 3 depicts an example web page.

FIG. 4 depicts a flowchart for constructing a query based on a URL for a web page, and evaluating the constructed query.

FIG. 5 depicts example mapping data.

FIG. 6 depicts mapping examples, which show URLs that a mapping service has mapped to content identifiers based on particular mapping data.

FIG. 7 depicts a flowchart for refreshing a list of help articles in a particular displayed web page, in response to a detected event, based on metadata from at least a portion of the web page.

DETAILED DESCRIPTION

Figure 1:
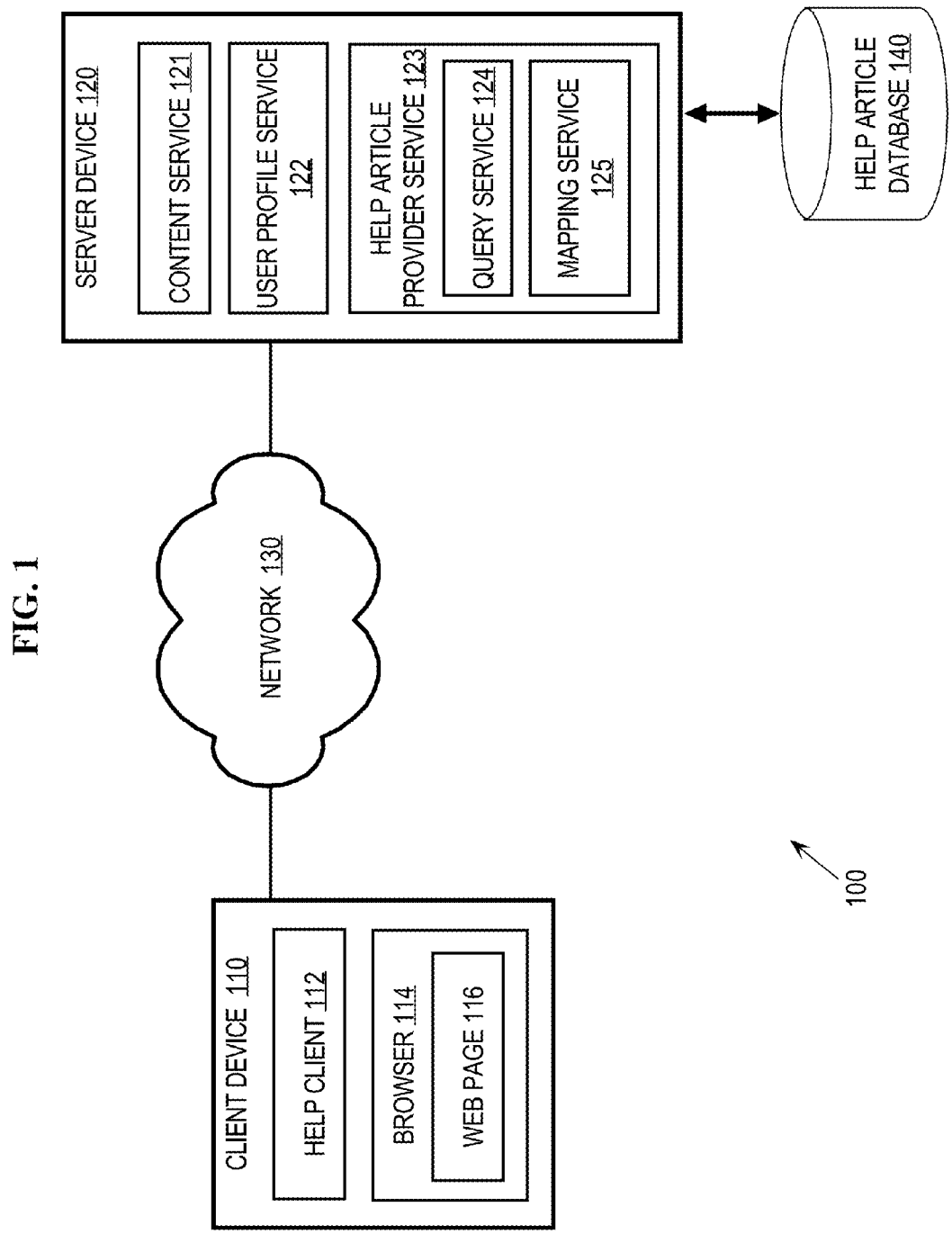
FIG. 1 is a block diagram that depicts an example network arrangement for identifying and displaying help articles that are related to the context of a currently-viewed web page.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described hereafter for displaying help articles, for a currently-viewed web page, that are related to the context of the web page. The "context" of a web page may include, for example, information related to the content of the web page, details about the user that is viewing the web page, etc.

According to one embodiment, a help article provider service has access to a database of help articles, each of which is associated with target-context data indicating an appropriate context for the help article. Target-context data for a help article may include, for example, one more web page content identifiers that tie the help article to web pages that are associated with the same content identifiers. Thus, the help article provider service may identify appropriate help articles for the context of a particular web page by comparing the web page's associated content identifiers with the target-context data of the help articles.

Further, target-context data for a help article may include user profile attributes for users that the help article targets (e.g., a spoken language used in the help article that maps to a preferred language in a user's profile, a type of the help article that maps to a preferred medium for help articles in a user's profile, a user role toward which the help article is directed that maps to a user role in a user's profile, etc.).

According to one embodiment, a help client is executed on a user's computer. The help client identifies help metadata values, if any, for a web page being displayed to the user and submits the metadata values along with the URL for the web page to the help article provider service. The help article provider service identifies content identifiers for the currently-viewed web page based on the metadata values and the URL. Specifically, the metadata values may contain content identifiers, or the help article provider service may identify content identifiers in mapping data that maps the metadata values and/or at least a portion of the URL of the web page to the content identifiers.

The help article provider service performs a search on the help article database by comparing the content identifiers for the currently-viewed web page to the target-context data of the help articles. The results of the search are a set of help articles that are associated with the content of the currently-viewed web page.

According to one embodiment, the help article provider service further filters the help articles for the currently-viewed web page based on attributes of the user for whom the help articles are being searched (the "target user"). Those attributes may be obtained, for example, from a user profile.

Such filtering excludes, from the set of help articles that will be displayed at the currently-viewed web page, help articles that are not for users with the user profile attributes of the target user. For example, if the target user's profile indicates that the user's preferred language is English, then help articles that are labeled as in Spanish are excluded from the set of help articles, associated with the content of the currently-viewed web page, that will be displayed to the target user. In one embodiment, the help client displays an ordered list of the identified help articles, with the most relevant or important help articles displayed at or near the top of the list.

The help client can be associated with any number of user interfaces, within the embodiments of the invention, since the presentation layer is not tied to the implementation of the help article service provider. Thus, the user interface for the help client may display identified help articles at a centralized location on the currently-viewed web page. Alternatively, there may be multiple locations on the currently-viewed web page at which one or more of the help articles are displayed. Also, because of the decoupling of the presentation layer and the help article service provider, the help article service provider may be retrofitted to a website that is already complex and well-established, with little or no modification to at least most of the web pages in the website.

Context-Based Help Architecture

Techniques are described hereafter for displaying help articles, for a currently-viewed web page, that are related to the context of the web page. As explained above, a help client that is installed on the client device may assist in the display of help articles, for a currently-viewed web page, that are related to the context of the web page. The help article service provider, which identifies the help articles for the currently-viewed web page, may reside on a server device that is communicatively connected to the client device over a network, such as the Internet.

Within embodiments, a help article can be a video, text, an image, an audio file, a web page (such as an HTML or XML file) or a link to a web page, a link to a pop out that allows the user to browse/search all help articles in a help article database, etc. To illustrate, a help article may be an HTML page within the website for the currently-viewed web page, or may be a link to a web page outside of the website, e.g., to a FAQ page, associated with a website other than the website for the currently-viewed web page, for a mail server that is used by the currently-viewed web page.

FIG. 1 is a block diagram that depicts an example network arrangement 100 for identifying and displaying help articles that are related to the context of a currently-viewed web page, according to embodiments. Network arrangement 100 includes a client device 110, and a server device 120 communicatively coupled via a network 130. Server device 120 is also communicatively coupled to a help article database 140. Example network arrangement 100 may include other devices, including client devices, server devices, and display devices, according to embodiments. For example, one or more of the services attributed to server device 120 herein may run on other server devices that are communicatively coupled to network 130.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a help client 112 and a browser 114 that displays web page 116. Help client 112 may be implemented in any number of ways, including as a plug-in to browser 114, as an application running on web page 116, etc. Browser 114 is configured to interpret and display web pages received over network 130, such as Hyper Text Markup Language (HTML) pages, and eXtensible Markup Language (XML) pages, etc. Client device 110 may be configured with other mechanisms, processes and functionalities, depending upon a particular implementation. Further, client device 110 is communicatively coupled to a display device (not shown in FIG. 1), for displaying graphical user interfaces (e.g., web page 116). Such a display device may be implemented by any type of device capable of displaying a graphical user interface. Example implementations of a display device include a monitor, a screen, a touch screen, a projector, a light display, a display of a tablet computer, a display of a telephony device, a television, etc.

Network 130 may be implemented with any type of medium and/or mechanism that facilitates the exchange of information between client device 110 and server device 120. Furthermore, network 130 may use any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a content service 121, a user profile service 122, and a help article provider service (HAPS) 123, which includes a query service 124, and a mapping service 125. One or more of services 121-125 may be part of a cloud computing service. Any of services 121-125 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), any other kind of communication, e.g., from help client 112 or from one of the other services 121-125. Further, any of services 121-125 may send one or more of the following over network 130 to help client 112 or to one of the other services 121-125: information via HTTP, HTTPS, SMTP, etc.; XML data; SOAP messages; API calls; and other communications according to embodiments. Services 121-125 may be implemented by one or more logical modules, and are described in further detail below. Server device 120 may be configured with other mechanisms, processes and functionalities, depending upon a particular implementation.

Server device 120 is communicatively coupled to help article database 140. Help article database 140 may reside in any type of storage, including volatile and non-volatile storage including random access memory (RAM), one or more hard or floppy disks, or main memory. The storage on which help article database 140 resides may be external or internal to server device 120. In one embodiment, help article database 140 stores information for help articles used by HAPS 123.

Help Graphical User Interfaces

According to embodiments, a graphical user interface (GUI) for help client 112, displayed in web page 116, gives a user access to information for help articles identified by HAPS 123 for web page 116 as described in further detail below. For example, FIG. 2A depicts a GUI 200 that includes help icon 202. GUI 200 may be displayed on web page 116, or concurrently with web page 116 in a web page framework for the website associated with web page 116.

Many times, a particular web page is part of a set of related web pages known as a website. The web pages of a website may be similarly styled, or may include similar visual elements, in order to visually communicate that the pages are related. At times, a website will present web pages of the website within a common GUI framework. A help icon, such as help icon 202, or other GUIs for help client 112, may be placed on the web pages of a website, or on the common framework for the web pages of the website. Thus, users may access help articles that are related to the context of each of the web pages of the website.

When help icon 202 is activated, help client 112 transitions GUI 200 to GUI 210 of FIG. 2B within web page 116. According to an embodiment, GUI 210 does not obscure other content in web page 116. GUI 210 of FIG. 2B displays a number of help articles in a list 212 that are identified by HAPS 123 as related to the context of web page 116. In an embodiment, a maximum number of help articles that may be displayed in GUI 210 is set by an administrator, or is set by a user in the user's profile.

In the depiction of FIG. 2B, GUI 210 also includes other information that may be helpful to the user. For example, activation of a "more help topics" link 214 may cause help client 112 to display a different set of help topics in the list 212. The different set of help topics may be help topics, not originally displayed in list 212, that were returned by HAPS 123 as related to the context of web page 116. Also, activation of "more help topics" link 214 may cause HAPS 123 to search for additional help articles in help article database 140, e.g., using slightly different terms in the query. Furthermore, as described below, activation of "more help topics" link 214 may cause help client 112 to display more information for the help articles that have been identified by HAPS 123 as related to the context of web page 116, including all help articles that were identified by HAPS 123 and not just a certain number of the identified help articles.

An example of web page 116 is depicted in FIG. 3, in which GUI 210 displays a list of help articles 212 that are related to the context of web page 116, including web content 310 of web page 116. The web content of a particular web page may be composed of multiple types of content data. For example, web content 310 of FIG. 3 includes HTML data 330 and a search application 320, which is not interpreted in the same way as HTML data 330. Search application 320 may run in a virtual machine (such as the Java Virtual Machine), or may run via an interpreter (such as a JavaScript interpreter), etc. In the example of FIG. 3, content displayed at search application 320 may change without changing the URL for web page 116.

Figure 2C:
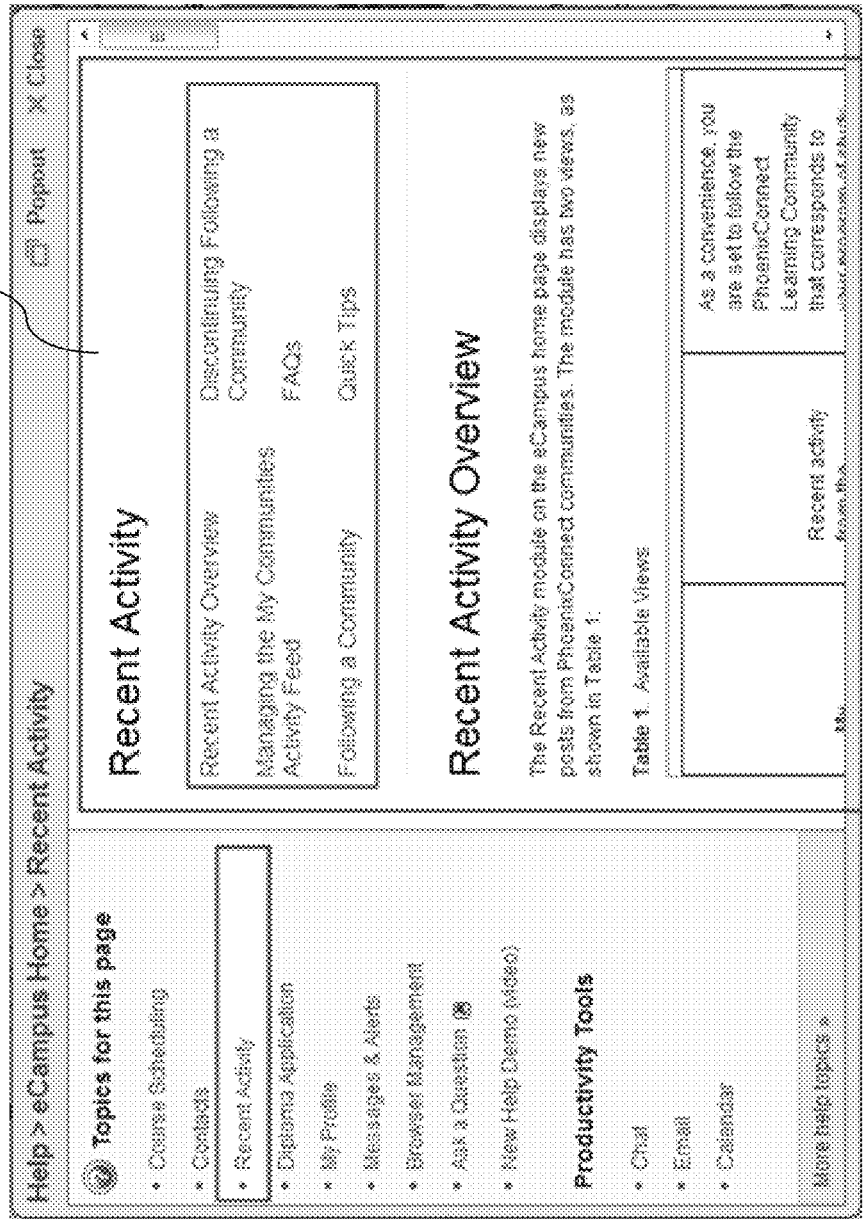

FIG. 2C depicts a GUI 220 that displays at least the help articles of list 212 of GUI 210, and allows the user to view the content of the help articles in view area 222. According to an embodiment, GUI 220 appears overlaid over the content of web page 116 and does not open in a new window. GUI 210 may include a mechanism by which a user may access GUI 220. This mechanism may be activated by clicking on link 214, or may be activated by clicking on any of the help articles in list 212. For example, a user clicks on a particular help article of list 212 and GUI 220 is displayed with a depiction of the particular help article displayed in view area 222.

The user interfaces described above for embodiments are illustrative, and do not limit the user interfaces that may be used in conjunction with the techniques described herein.

Relating Help Articles to Web Page Content

HAPS 123 performs a search for help articles in help article database 140 that are related to the context of web page 116. According to an embodiment, browser 114 receives a Uniform Resource Locator (URL) for web page 116 and requests the data for displaying web page 116 from content service 121. Once web page 116 is rendered in browser 114 from the data retrieved from content service 121, help client 112 requests that HAPS 123 return information for help articles that are related to the context of web page 116.

Any one of a variety of events may trigger help client 112 to send the request for help articles. For example, the request may be sent automatically in response to the request or loading of web page 116. Alternatively, the request may be sent in response to user input, such as selecting a "help" control that is presented to the user. The techniques described herein are not limited to any particular triggering event for the request of help articles.

In response to the help article request, HAPS 123 causes query service 124 to formulate a query, over help article database 140, based on one or more of: (a) the URL for web page 116, (b) metadata for web page 116, and (c) attributes of an authenticated user's profile. Query service 124 may construct the query using any combination of URL, metadata, and user profile attributes within embodiments.

HAPS 123 runs the formulated query over help article database 140. As mentioned above, running the query may involve comparing context attributes to target-context data associated with the help articles. HAPS 123 then returns, to help client 112, information for the help articles in the query results. Help client 112 causes the returned information for the help articles to be made available to the user that is viewing web page 116 (e.g., in GUI 210 or GUI 220 displayed in web page 116, as in FIG. 3).

Queries Based on URL Portions

FIG. 4 depicts a flowchart 400 for constructing a query based on a URL for the currently-viewed web page, and evaluating the constructed query. At step 402, mapping data that defines one or more mappings between (a) portions of locator strings, and (b) keywords, is maintained by HAPS 123 According to one embodiment, the one or more mappings include a particular mapping that associates at least a portion of a locator string, for a particular web page, with a keyword; and wherein the particular web page is related to particular subject matter.

For example, mapping service 125 maintains mapping data that defines mappings between portions of URLs and keywords. The mapping data may be a configuration file that mapping service 125 maintains at server device 120 or at a device accessible to server device 120 via network 130. Also, the mapping data may be stored in a database, such as a SQL-based relational database. To illustrate mapping data, FIG. 5 depicts example mapping data 500 that includes mappings 502-510. Mappings 502-510 map content identifiers in column 520 to URLs in column 530. The content identifiers may be used as the keywords referred to in step 402.

The content, or subject matter, of web pages is identified using the content identifiers in column 520. For example, mapping 502 maps "https://portal.qaols.phoenix.edu" to the content identifier "LN1". The content identifier "LN1" may, in turn, be included as part of the target-context data of particular help articles in help article database 140. Thus, any help article whose target-context data includes "LN1" is considered to be related to the subject matter of web pages that match the URL of mapping 502, as described in further detail below.

Referring again to FIG. 4, at step 404, occurrence of an event is detected while at least a portion of the particular web page is being displayed; wherein the event indicates that information about help articles should be displayed. For example, help client 112 detects that a user activates help icon 202 in web page 116, as depicted in FIG. 2A, to transition GUI 200 displayed in web page 116 to GUI 210. This event requires that information about help articles that are related to the context of web page 116 be displayed at help articles list 212.

As a further example, help client 112 detects that web page 116 has been reloaded, or that one of the objects of web page 116 has changed. Help client 112 may detect such an event by subscribing to events thrown by the objects of web page 116. According to embodiments, other events not described herein may indicate that information for help articles should be displayed at web page 116.

Matching URLs in the Mapping Data

When the event of step 404 is detected, control passes to step 406. At step 406, it is determined, based on the particular mapping, that at least a portion of the locator string for the particular web page is mapped to the keyword. For example, help client 112 sends, to HAPS 123, at least the URL for web page 116. HAPS 123 causes mapping service 125 to identify keywords, or content identifiers, that are mapped to at least a portion of the received URL in mapping data, e.g., mapping data 500.

According to one embodiment, mapping service 125 uses the following rules to identify keywords that match at least a portion of a URL:

1. An incoming (captured) URL needs to match as much URL as is specified in a mapping in the mapping data.
2. If the incoming URL does not match at least all of the components of a particular mapped URL, then mapping service 125 will not consider the incoming URL to match the particular mapped URL.
3. If the base URL of an incoming URL matches a particular mapped URL, and the incoming URL contains path components in addition to the base URL, then mapping service 125 will consider the incoming URL to match the particular mapped URL.
4. Inheritance rule: based on principle #3 above, mapping service 125 may return multiple matches, e.g., from most specific to least specific, for a given captured URL.
5. Mapping service 125 will interpret "*" in a mapped URL as a wildcard that stands for zero or more additional characters.
6. If the incoming URL has query parameters, then the incoming URL matches a particular mapped URL that also has query parameters if the base URLs are the same and the incoming URL has at least the same query parameters as the particular mapped URL.

Mapping service 125 returns all content identifiers (column 520) in mapping data 500 that match at least a portion of the submitted URL according to one or more of the rules listed above. For purposes of explanation, mapping service 125 is described herein as applying all of the rules listed above. However, embodiments may apply any subset of the above rules, or may employ entirely different rules.

To illustrate the functioning of mapping service 125, FIG. 6 depicts mapping examples 602-618, which show URLs in column 630 that mapping service 125 has mapped to content identifiers in column 640 based on mapping data 500 of FIG. 5. Mapping examples 602-618 of FIG. 6 are described in further detail below.

In mapping example 602, mapping service 125 receives the following URL for web page 116: "https://portal.qaols.phoenix.edu". Within mapping data 500, only the URL for mapping 502 matches the received URL for web page 116 (as an exact match). Thus, mapping service 125 returns "LN1" as a keyword for the submitted URL.

In mapping example 604, mapping service 125 receives the following URL for web page 116: "https://portal.qaols.phoenix.edu?name=Bob". Within mapping data 500, the URL for mapping 502 matches the base URL of the received URL for web page 116. Thus, mapping service 125 returns "LN1" as a keyword for the submitted URL. If the captured URL contains extra parameters (which have not been specified in a URL of mapping data 500), then the extra parameters will be ignored and mapping service 125 will still consider it to be a match. The URL for mapping 510 does not match the received URL because the received URL does not contain the query components that the URL for mapping 510 contains.

In mapping example 606, mapping service 125 receives the following URL for web page 116: "https://portal.qaols.phoenix.edu/home.html". Within mapping data 500, the URL for mappings 502 and 504 match the received URL for web page 116. The URL for mapping 504 is an exact match, and the URL for mapping 502 is a match of the base URL. Mapping service 125 does not consider the URL of mapping 510 to be a match since the captured URL did not contain the required parameters. Thus, mapping service 125 returns "LN2" and "LN1" as keywords for the submitted URL.

In mapping example 608, mapping service 125 receives the following URL for web page 116: "https://portal.qaols.phoenix.edu/home2.html". Within mapping data 500, the URL for mapping 502 matches the base URL of the received URL for web page 116. Thus, mapping service 125 returns "LN1" as a keyword for the submitted URL.

In mapping example 610, mapping service 125 receives the following URL for web page 116: "https://portal.qaols.phoenix.edu/home.html?name=Bob&place=Wonderland". Within mapping data 500, the URL for mappings 502 and 504 match the received URL for web page 116 since the URLs for mappings 502 and 504 each match a base URL of the received URL. Mapping service 125 does not consider the URL of mapping 510 to be a match since the captured URL did not contain the required parameters. Although both the required parameters keys are present in the URL for web page 116 (i.e., "name" and "place"), but the value of the "name" parameter (i.e., Bob) does not match the required value (i.e., Alice) in mapping 510. Thus, mapping service 125 returns "LN2" and "LN1" as keywords for the submitted URL.

In mapping example 612, mapping service 125 receives the following URL for web page 116: "https://portal.qaols.phoenix.edu/home.html?name=Alice&place=Wonderland". Within mapping data 500, the URL for mapping 502 matches the base URL of the received URL for web page 116, and the URLs for mappings 504 and 510 exactly match. Thus, mapping service 125 returns "LN5", "LN2", and "LN1" as the keywords for the submitted URL.

In mapping example 614, mapping service 125 receives the following URL for web page 116: "https://portal.qaols.phoenix.edu/home.html?name=Alice&place=Wonderland&type=Book". Within mapping data 500, the URL for mapping 502 matches the base URL of the received URL for web page 116, and the URLs for mappings 504 and 510 exactly match. The addition of "type=Book" to the query terms does not inhibit a match with mapping 510. Thus, mapping service 125 returns "LN5", "LN2", and "LN1" as the keywords for the submitted URL.

In mapping example 616, mapping service 125 receives the following URL for web page 116: "https://portal.qaols.phoenix.edu/357/xbjgsdfashbvjf/program". Within mapping data 500, the URL for mapping 502 matches the base URL of the received URL for web page 116, and the URL for mapping 506 based on the wildcards principle. Thus, mapping service 125 returns "LN3" and "LN1" as the keywords for the submitted URL.

In mapping example 618, mapping service 125 receives the following URL for web page 116: "https://portal.qaols.phoenix.edu/357/program". Within mapping data 500, the URL for mapping 502 matches the base URL of the received URL for web page 116, but does not match the URL for mapping 506. Thus, mapping service 125 returns "LN1" as the keyword for the submitted URL.

In mapping example 620, mapping service 125 receives the following URL for web page 116: "https://somedomain.qaols.phoenix.edu/home.html". Within mapping data 500, none of the URLs match the received URL. Thus, mapping service 125 returns an empty set of keywords for the received URL.

In an embodiment, the set of content identifiers identified by mapping service 125 are ordered based on the specificity of the mapping that produced the content identifiers. For example, results may be ordered by how exact a match between a submitted URL and a mapped URL, from most exact to least exact.

Wildcards in Mapping Data

Wildcards in the URLs of mapping data can allow administrators to map unique content identifiers to very specific web pages. In turn, the administrators can assign particular help articles to the content identifiers that are targeted for the specific web pages. For example, in the context of a university website, school administrators can use wildcards in mapping data to target a help article to a particular course web page, or to a particular section of a particular course. URLs for such course web pages may have dynamic components, which are not the same for every user, e.g., user identifiers, information based on the current date or time, etc. Including all possible iterations of URLs that have dynamic components in mapping data may be tedious and expensive. An administrator may create a mapping between a content identifier and all iterations of a particular URL that has a dynamic component by replacing the dynamic component with a wildcard symbol. Thus, the administrator need not include every possible value of the dynamic component of the URL in the mapping data.

Constructing a Query Based on the URL Keywords

At step 408, a query that is based, at least in part, on the keyword is constructed. For example, query service 124 constructs a query based on the content identifiers returned from mapping service 125. To illustrate, if mapping service 125 returns the content identifier "LN1" based on the URL for web page 116, then query service 124 constructs a query to select help articles from help article database 140 that are associated with the content identifier "LN1". Target-context data for a particular help article that is stored at help article database 140 may include many types of information. For example, in one embodiment, the target-context data for help articles includes one or more of:

one or more content identifiers
a title,
a location,
format information,
description information,
an expiration date,
priority information,
user profile attributes.

As another example of query construction, if mapping service 125 returns the content identifiers "LN1" and "LN2" based on the URL for web page 116, then query service 124 constructs a query to select help articles from help article database 140 that are associated with either the content identifier "LN1" or the content identifier "LN2".

At step 410, the query is executed against a database of help articles. For example, HAPS 123 executes the query constructed by query service 124 against help article database 140.

At step 412, the results of the query are received. For example, HAPS 123 receives the results of the query that was executed against help article database 140. The query results include information for one or more help articles that satisfy the terms of the constructed query.

According to an embodiment, if no help articles are returned from executing the query, HAPS 123 identifies a set of default help articles to display on web page 116. In this embodiment, HAPS 123 may maintain a list of default help articles, or HAPS 123 may run a query, against help article database 140, that is configured to identify help articles in the database that are labeled with a "default" content identifier, etc. According to another embodiment, HAPS 123 runs a query against help article database 140 that is configured to identify help articles in the database that are the "most viewed" help articles, or that are the highest rated help articles based on statistics and user rating information that is maintained for the help articles in help article database 140. The help articles identified by such a query are used as the default help articles.

At step 414, information for one or more help articles indicated in the query results is displayed to a user. For example, information for the help articles identified by HAPS 123 (e.g., titles of the help articles) are displayed in GUI 210 or GUI 220 on web page 116. As previously indicated, the users may select a particular help article to view the help article's content, e.g., in view area 222 of GUI 220.

Help client 112 may cause only a certain number of the list of help articles that HAPS 123 has identified for web page 116 to be displayed at web page 116, e.g., if the current GUI for displaying the list is GUI 210, which has limited space for help article list 212. Help client 112 may cause the entire list of help articles that HAPS 123 has identified for web page 116 to be displayed at web page 116, e.g., if the current GUI for displaying the list is GUI 220, which may be configured with a scroll bar to accommodate information for a large number of help articles.

Constructing a Query Based on Metadata

HAPS 123 may cause query service 124 to construct a query based, at least in part, on metadata for web page 116. Specifically, web page 116 may include metadata tags ("help metadata tags") that store information for HAPS 123 by which HAPS 123 may identify help articles that are related to the context of web page 116. Help metadata tags may be associated with web page 116 in general, or may be associated with particular portions of web page 116, such as an application running on web page 116. Help client 112 may identify help metadata tags based on the name of the metadata tag, e.g., "metatag", or "logical_name", or "help_article_info", etc.

To illustrate metadata tags that are associated with just a portion of a web page, search application 320 that is depicted in web page 116 in FIG. 3 may have help metadata tags associated therewith, which help metadata tags are separate from any help metadata tags that are associated generally with web page 116. The help metadata tags associated with search application 320 contain information about the context for search application 320. Thus, by using information stored at the help metadata tags for search application 320, HAPS 123 can provide help articles that are related to the content/context of search application 320, the content for which may change independently from the URL of the web page.

In other words, the displayed content of search application 320 may change without the URL of web page 116 changing. Thus, content identifiers obtained based exclusively on the URL are unlikely to reflect the context of search application 320 at the time help articles are requested. Thus, instead of, or in addition to, obtaining content identifiers based on the URL, the metadata tags associated with the search application 320 may be used to identify help articles.

To illustrate an example of the content of search application 320 changing without the URL of web page 116 changing, a user types a search query term into a field of search application 320 (of FIG. 3) and causes search application 320 to run a search query over a database of documents. Search application 320 presents a search results GUI that is different from the GUI for search application 320 that is depicted in FIG. 3, which change does not also change the URL for web page 116.

This search results GUI for search application 320 has different features than the GUI for search application 320 that is depicted in FIG. 3. Thus, help articles that are relevant to the GUI depicted in FIG. 3 for search application 320 may not be relevant to a search results GUI for search application 320. As such, prior to displaying the search results GUI, search application 320 may be associated with a first help metadata tag value that is related to the content of search application 320 when displaying the GUI depicted in FIG. 3. Also, subsequent to displaying the search results GUI, search application 320 may be associated with a second help metadata tag value that is related to the content of the search results GUI of search application 320.

According to one embodiment, help metadata tags store content identifiers that can be directly used in queries constructed by query service 124. The content identifiers stored in help metadata tags for web page 116, and/or in help metadata tags for applications displayed in web page 116, are analogous to and can be used in combination with the content identifiers that mapping service 125 identifies for URLs submitted to mapping service 125.

According to another embodiment, help metadata tags for web page 116, and/or help metadata tags for applications displayed in web page 116, store values that are mapped to content identifiers in mapping data accessible by mapping service 125. In this embodiment, values that are extracted from help metadata tags are submitted to mapping service 125 to determine whether the help metadata tag values are mapped to any content identifiers in the mapping data. Query service 124 uses the content identifiers returned by mapping service 125 to construct queries over help article database 140.

Constructing a Query Based on User Information

Additionally, HAPS 123 may use attribute information from a user profile for a user that has authenticated with the website for web page 116 at client device 110 (the "authenticated user") to determine what help articles to display at web page 116.

A user may log into the website associated with web page 116 using authentication information that identifies a user profile for the user. The user's profile includes user attribute information, which may include one or more of: a role; a gender; spoken and/or written language preferences; a preferred medium for help articles (e.g., text help articles only, etc.); a course of study; one or more classes in which the user is enrolled; a group of users that the user is associated with; a version of software that the user employs (e.g., a Teacher's Assistant section of a particular course that the user belongs to); etc.

HAPS 123 obtains user profile data for an authenticated user from user profile service 122, which has access to all user profiles registered with the website for web page 116. Thus, when HAPS 123 constructs an updated list of help articles for web page 116, HAPS 123 requests user profile information for the authenticated user from user profile service 122. User profile service 122 returns, to HAPS 123, the user profile information for the user that is currently authenticated at client device 110.

HAPS 123 returns results, to help client 112, that are filtered based on one or more attributes of the authenticated user indicated in the user profile information. When results are filtered based on attributes of a user, those help articles among the results that do not contradict the attributes of the user are identified and displayed to the user. According to an embodiment, a help article contradicts an attribute of a user when the help article is associated with an attribute value, e.g., in metadata of the help article, that is not included in the user's profile. According to another embodiment, a help article contradicts an attribute of a user when the help article is associated with an attribute value that is different from an attribute value that is included in the user's profile. For example, if a user's profile indicates that the user is enrolled in Classes A, B, and C, and a help article in the results is associated with Class D, the help article contradicts the attributes of the user and is removed from the results.

In one embodiment, HAPS 123 filters the results by causing query service 124 to construct a query based, at least in part, on user profile attribute information. For example, query service 124 constructs a query to exclude, from query results, help articles in help article database 140 that are associated with user profile attributes that are not included in the authenticated user's profile. In another embodiment, HAPS 123 filters the results by removing, from the results of an executed query, those help articles that are associated with user profile attributes that the authenticated user's profile does not include before returning the results to help client 112. If a particular help article does not have a user profile attribute associated therewith in help article database 140, the article is applicable to all users.

User profile attribute data is useful to determine what help articles to display at web page 116 when help article database 140 contains information, for at least one help article, that indicates that the help article is directed toward a user with at least a certain user profile attribute. A help article may be directed toward users with any particular attribute value of any attribute in the users' profiles. For example, some help articles in help article database 140 may be created for English speakers and some other help articles in the database may be created for Spanish speakers. Help article database 140 may include information for the English help article and for the Spanish help article that specifies that the help articles are directed toward users with user profile attribute information that indicates that the user prefers English and Spanish, respectively. As another example, a particular help article explains a feature of web page 116 that is only available to a user that acts in a faculty role. Help article database 140 includes information for the particular help article that indicates that the help article is directed toward users with user profile attribute information that indicates that the user acts in the faculty role.

Prioritizing Help Articles Using Set Priority Values

A list of help articles displayed for web page 116, e.g., list 212 in GUI 210 of FIG. 2B, is ordered by the respective priorities of the help articles in the list. In an embodiment, within the target-context data of a help article, a priority value is assigned to one or more of the content identifiers. The ranking of the help articles that match a query is based, at least in part, on the priority values in the target-context data of the help articles that are associated with the content identifiers that matched the query.

For example, if a help article is associated with two content identifiers in help article database 140, the help article will have a priority value for each of the two content identifiers. In embodiments, the priority of a help article, for a particular content identifier, indicates the help article's usefulness for a web page that is associated with the particular content identifier. By ordering the help article list displayed at web page 116 by the applicable priority value (i.e., by priority values that each help article has for content identifiers associated with web page 116), the most useful help articles will be at the top of the list.

Because help articles have different priorities for different content identifiers, the help articles may be ordered differently for different web pages. For example, a particular help article describes a widget that is found on many web pages of a website. The widget is more heavily used on a first web page than on a second web page. The priority for the widget's help article can be greater (which, in an embodiment, is indicated by a smaller number) for the content identifier associated with the first web page than for the content identifier associated with the second web page. Thus, the widget's help article will be ordered higher in the list of help articles displayed on the first web page than in the list of help articles displayed on the second web page.

More specifically, a first help article is associated with content identifier "LN1" with a priority value of 1 and with content identifier "LN2" with a priority value of 75. A second help article is associated with content identifier "LN1" with a priority value of 50 and with content identifier "LN2" with a priority value of 50. HAPS 123 determines an ordering for the list of help articles for web page 116 based on the priority values for the returned help articles. If both the first and second help articles are included in the list of help articles for web page 116 because the web content for web page 116 is associated with content identifier "LN1", then the first help article would appear higher in the list of help articles than the second help article, based on the priority values for content identifier "LN1". However, if the first and second help articles are included in the list of help articles for web page 116 because the web content for web page 116 is associated with content identifier "LN2", then the first help article would appear lower in the list of help articles than the second help article, based on the priority values for content identifier "LN2".

In an embodiment, a priority value in help article database 140 for a help article is associated with a user profile attribute. The priority value, for a help article, that is associated with a user profile attribute that corresponds with an attribute of the authenticated user in the user's profile is used to order the help article in the list displayed at web page 116. For example, a particular help article has a first priority value, in help article database 140, and is associated with a user profile attribute that represents a "student" role. The particular help article also has a second priority value, in the database, that is associated with a user profile attribute that represents a "faculty" role. The help article is ordered in the ordered list for web page 116 based on the first priority value if the authenticated user's role, according to the user's profile data, is "student". Alternatively, the help article is ordered in the ordered list for web page 116 based on the second priority value if the authenticated user's role, according to the user's profile data, is "faculty".

According to a further embodiment, a priority value for a particular help article may be associated with both a content identifier and a user profile attribute value.

Prioritizing Help Articles Using Calculated Priority Values

According to another embodiment, the priority of a particular help article for a particular content identifier and/or profile attribute is automatically calculated by HAPS 123. In this embodiment, HAPS 123 calculates a priority value for a particular help article based on one or more of: user ratings of the help article, mapping data used to identify the help article, and a priority value included in help article database 140 for the help article (as described above).

Calculating Priority Values Based on User Ratings

To obtain a user rating for a particular help article, help client 112 may provide a user with a mechanism by which the user can rate the particular help article, indicating how helpful the help article was to the user. Help client 112 captures both the user rating data and information about the context in which the help article was rated. Context information for a help article user rating may include one or more of: information from the user's profile (e.g., a role of the user, a preferred language for the user, a preferred medium for help articles, etc.), a content identifier for the web page that was displayed to the user when the user selected the help article for consumption (the "viewed web page"), a URL for the viewed web page, metadata from the viewed web page, etc. The context information for a user rating is communicated to HAPS 123 with the user rating data to allow HAPS 123 to calculate a context-specific priority value for the help article based on the user rating.

HAPS 123 may receive two or more user ratings for a particular help article, where at least one of the received user ratings is associated with different context information than another of the received user ratings. Context information associated with user ratings may be different based on attribute values in the user profiles for the users (such as a role of a user, a preferred language for a user, a preferred medium for help articles, etc.), metadata for a viewed web page, a URL of a viewed web page, a content identifier for a viewed web page, etc.

For example, HAPS 123 may receive a first user rating for a particular help article with context information indicating a first content identifier for the associated viewed web page, and a second user rating for the same help article with context information indicating a second content identifier for the associated viewed web page. HAPS 123 (*a*) calculates a first priority value for the help article for the first content identifier based, at least in part, on the first user rating and (b) calculates a second priority value for the help article for the second content identifier based, at least in part, on the second user rating. The first priority value would be used to determine where, in an ordered list of help articles, the particular help article should be displayed when the currently-viewed web page is associated with the first content identifier. The second priority value would be used to determine where, in an ordered list of help articles, the particular help article should be displayed when the currently-viewed web page is associated with the second content identifier.

As a further example, HAPS 123 receives a first user rating for a particular help article with first context information indicating a first role for an authenticated user, and a second user rating for the same help article with second context information indicating a second role for an authenticated user. HAPS 123 (*a*) calculates a first priority value, for the help article, that is distinguished by the first user role based, at least in part, on the first user rating; and (b) calculates a second priority value, for the help article, that is distinguished by the second user role based, at least in part, on the second user rating. The first priority value would be used to determine where, in an ordered list of help articles, the particular help article should be displayed when the authenticated user is associated with the first role in the user's profile. The second priority value would be used to determine where, in an ordered list of help articles, the particular help article should be displayed when the authenticated user is associated with the second role in the user's profile.

Calculating Priority Values Based on Mapping Data

Furthermore, HAPS 123 may calculate priority values for a help article based on how well the URL of the web page matched the URL that maps to the content identifier that matched the help article. For example, assume that the currently-viewed web page has a first URL that matches a second URL of a particular mapping, and that the particular mapping maps the second URL to a content identifier that matches a particular help article. In this example, the match between the first URL and the second URL may have been an exact match, or an inexact match. In the case of an exact match, HAPS 123 may assign the particular help article a priority value that is higher than would otherwise be assigned to the help article if the match had been inexact. The higher priority indicates that the exact match help article is more relevant to the currently-viewed web page than a help article that is selected for display because of an inexact URL-to-URL match.

Force Matching Help Articles

According to an embodiment, HAPS 123 recognizes a "match-all" flag on a help article that causes the help article to be included in all lists of articles displayed on all web pages. For example, a help article may be associated with a particular content identifier (e.g., "match_all") that acts as a match-all flag. Such a content identifier is treated as though it matched the search criteria of all help article queries. Consequently, any help article with the flag is listed in every help article listing.

As a further example, a help article may be included in a list of articles accessible by HAPS 123, where inclusion is this list acts as a virtual match-all flag. As a further example, a help article may include a match-all flag (separate from the content identifiers of the help article) in the data for the help article in help article database 140. Help articles with a match-all flag are referred to herein as match-all help articles.

According to one embodiment, HAPS 123 places match-all help articles at or near the top of every ordered list of help articles without regard to whether help articles appearing below the match-all help article in the list are more relevant to the context of currently-viewed web page (as indicated in the priority values for the help articles in the list). Thus, any help article that includes a match-all flag will be quickly identified by users of web page 116. This mechanism allows administrators to propagate the most up-to-date help information to users without requiring users to proactively seek help information from limited resources, such as by calling into potentially swamped help lines.

According to an embodiment, HAPS 123 also supports "match-many" flags and/or content identifiers. Unlike help articles associated with the match-all flag, help articles associated with a match-many flag do not show up in all help article lists. Instead, a match-many help article is applicable to only a subset of web pages. Each particular match-many help article may be scoped to only those pages with particular content identifiers, or to only those pages whose URLs contain a certain base URL.

According to another embodiment, a particular match-many help article is displayed to only those authenticated users that have a particular attribute in the user's profile. For example, a particular match-many help article may be scoped to users that are enrolled in a particular course, or that are a member of a particular user group. Such a user-attribute-specific match-many help article may be helpful to allow a leader of a particular course to disseminate help information for an assignment for the course (e.g., how to fix an error on an assignment page), or for the leader of a group to disseminate help information to people that belong to the group.

A match-many help article may match a particular URL (or portion of a URL) for web page 116 when a URL in metadata for the match-many help article matches the particular URL (or portion thereof) of web page 116. Similarly, a match-many help article may match an attribute of a user's profile if the attribute value of the user's attribute is found in metadata of the match-many help article.

For example, a particular user may create a help article that is scoped to a particular course or to a particular group of people. This help article may be added to help article database 140 with associated user profile attributes, e.g., indicating that the help article is applicable to users enrolled in the particular class, is applicable to users that belong to the particular group, etc. If the help article also includes a match-many flag, the help article will be displayed at or near the top of any list of help articles displayed to a user with a user profile attribute value that matches the user profile attribute data for the help article.

Updating the Displayed List of Help Articles

According to one embodiment, HAPS 123 is configured to detect events that require HAPS 123 to refresh the help article list displayed for web page 116. Such an event may be initiated by the user (e.g., the user refreshes web page 116, the user activates help icon 202 of GUI 200 in FIG. 2A, etc.) or may not be initiated by the user (e.g., an application displayed in web page 116 changes or updates, an application displayed in web page 116 fails in some way, etc.). If a GUI that displays a list of help articles for web page 116 (such as GUI 210 or GUI 220) is displayed in web page 116 at the time that help client 112 detects such an event, then the displayed help GUI (GUI 210 or GUI 220) is automatically updated, by help client 112, to depict the newest list of help articles for web page 116.

FIG. 7 depicts a flowchart 700 for refreshing a list of help articles in a particular displayed web page, in response to a detected event, based on metadata from at least a portion of the web page. The steps of flowchart 700 are performed while the particular web page is being displayed. At step 702, prior to detecting an event that changes content displayed in the particular web page without changing a locator string of the particular web page, displaying information for a first set of one or more help articles in connection with the particular web page. For example, help client 112 displays a first list of help articles in web page 116, e.g., list 212 of GUI 210 (see FIG. 3).

At step 704, the event is detected. For example, help client 112 detects an error thrown by an application running on web page 116, e.g., search application 320. The event that caused the thrown error changes content for search application 320, but does not cause the URL for web page 116 to change. When search application 320 changes, search application 320 publishes an event to browser 114. Help client 112 subscribes to events that are published to browser 114. Thus, when search application 320 publishes a change event to browser 114, browser 114 notifies help client 112 of the event.

Help client 112 determines whether the detected event qualifies as an event that would cause help client 112 to refresh the list of help articles (212) that are currently displayed at web page 116. For example, help client 112 maintains data indicating the types and sources of events that would cause help client 112 to refresh the list of help articles displayed at a currently-viewed web page.

After detecting the event of step 704, control passes to step 706. At step 706, metadata is retrieved from at least a portion of the particular web page that contains content that changed in response to the event. For example, help client 112 identifies help metadata tags that are associated with search application 320. As described above, a help metadata tag may have a value that is a content identifier or may have a value that is mapped to one or more content identifiers in mapping data managed by mapping service 125. Help client 112 retrieves the values of the help metadata tags for search application 320.

At step 708, a second set of one or more help articles is retrieved based, at least in part, on the retrieved metadata, wherein the first set of one or more help articles is different from the second set of one or more help articles. For example, help client 112 communicates the metadata values from the help metadata tags for search application 320 to HAPS 123. HAPS 123 causes query service 124 to construct a query based, at least in part, on the metadata values as described above.

The results of the query include at least help articles, from help article database 140, that are related to the content of search application 320 on web page 116. Thus, the user has access to the latest help articles for an updated web page 116 even when a change on web page 116 does not affect the URL for the web page. Furthermore, HAPS 123 may cause query service 124 to construct a query based on all help metadata tags associated with web page 116, the URL of web page 116, and any applicable user profile attribute data for the authenticated user in order to identify all applicable help articles for the second set of one or more help articles.

HAPS 123 executes the query over help article database 140, which returns a second set of help articles that is different than the set of help articles displayed in list 212 at web page 116 prior to detecting the event. The second set of help articles may be different than the first set of help articles because, after the first set of help articles was identified, an administrator added a help article to help article database 140 that addresses the cause of the error thrown by search application 320, which is now included in the second set of help articles. Furthermore, the second set of help articles may be different than the first set of help articles because web page 116 includes different help metadata tag values, on which the query for the second set of help articles is based, than the help metadata tag values on which the query for the first set of help articles was based.

At step 710, information for the second set of one or more help articles is displayed in connection with the particular web page. For example, the list of help articles that help client 112 caused web page 116 to display prior to detecting the event is replaced with an ordered list of the second set of help articles (at list 212) that was identified using at least the values of the help metadata tags associated with search application 320.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
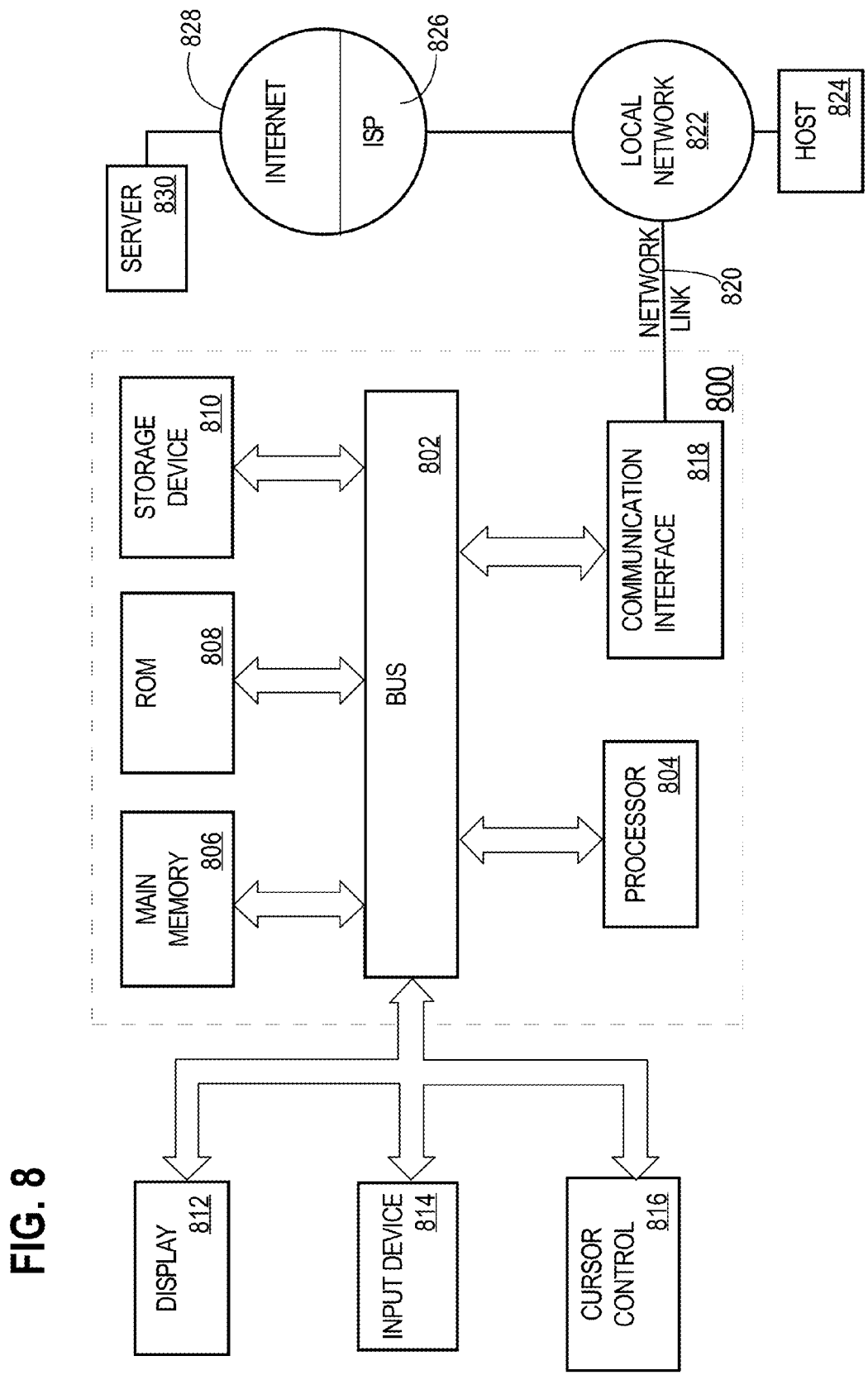
FIG. 8 is a block diagram of a computer system on which embodiments may be implemented.

For example, FIG. 8 is a block diagram that illustrates a computer system 800 upon which the techniques described herein may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    detecting occurrence of a user action while particular content is being displayed, to a user, on a particular web page;
    wherein the user action indicates that information about help articles relating to the particular content should be displayed; and
    in response to detecting occurrence of the user action:
        identifying, from a plurality of available help articles, a set of help articles relating to the particular content;
        performing a comparison between:

one or more attributes of the user, and
attribute metadata, that comprises user profile attribute values that are applicable to a plurality of users, associated with each help article in the set of help articles;
based on the comparison, selecting, from the set of help articles relating to the particular content, one or more selected help articles that correspond to the particular content and that are associated with metadata that comprises user profile attribute values that do not contradict the one or more attributes of the user; and
wherein one or more articles, of the set of help articles, are excluded from the one or more selected help articles based on the one or more articles being associated with metadata that comprises user profile attribute values that contradict the one or more attributes of the user;
displaying information from the one or more selected help articles;
wherein the method is performed by one or more computing devices.

2. The method of claim 1, further comprising:
constructing a query that is based, at least in part, on said one or more attributes of the user;
executing the query against a database of help articles storing the plurality of available help articles; and
wherein executing the query causes performance of the steps of: identifying, performing the comparison, and selecting;
wherein the plurality of available help articles are in the database of help articles;
receiving results of the query, wherein the results include the one or more selected help articles;
wherein displaying information from the one or more selected help articles comprises displaying information from the one or more selected help articles included in the query results.

3. The method of claim 1, further comprising:
constructing a query that is based, at least in part, on one or more of:
a locator string for the particular web page, or
metadata from at least a portion, of the particular web page, that displays the particular content;
executing the query against a database of help articles storing the plurality of available help articles;
wherein executing the query causes performance of the steps of: identifying, performing the comparison, and selecting;
wherein the plurality of available help articles are in the database of help articles;
receiving results of the query indicating a results set of help articles;
removing, from the results set of help articles, one or more help articles that are associated with attribute metadata that comprises user profile attribute values that are different from said one or more attributes of the user, to produce filtered query results;
wherein displaying information from the one or more selected help articles comprises displaying information from one or more help articles in the filtered query results.

4. The method of claim 1, wherein:
the value of a particular attribute of the one or more attributes of the user indicates a particular spoken language;
the one or more selected help articles include a language-specific help article; and
the attribute metadata of the language-specific help article includes a user profile attribute value, for the particular attribute, that indicates the particular spoken language.

5. The method of claim 1, wherein:
the value of a particular attribute of the one or more attributes of the user indicates a particular user role;
the one or more selected help articles include a role-specific help article; and
the attribute metadata of the role-specific help article includes a user profile attribute value, for the particular attribute, that indicates the particular user role.

6. One or more non-transitory computer-readable media storing instructions which, when executed by one or more processors, cause:
detecting occurrence of a user action while particular content is being displayed, to a user, on a particular web page;
wherein the user action indicates that information about help articles relating to the particular content should be displayed; and
in response to detecting occurrence of the user action:
identifying, from a plurality of available help articles, a set of help articles relating to the particular content;
performing a comparison between:
one or more attributes of the user, and
attribute metadata, that comprises user profile attribute values that are applicable to a plurality of users, associated with each help article in the set of help articles;
based on the comparison, selecting, from the set of help articles relating to the particular content, one or more selected help articles that correspond to the particular content and that are associated with metadata that comprises user profile attribute values that do not contradict the one or more attributes of the user; and
wherein one or more articles, of the set of help articles, are excluded from the one or more selected help articles based on the one or more articles being associated with metadata that comprises user profile attribute values that contradict the one or more attributes of the user;
displaying information from the one or more selected help articles.

7. The one or more non-transitory computer-readable media of claim 6, wherein the instructions further comprise instructions which, when executed by one or more processors, cause:
constructing a query that is based, at least in part, on said one or more attributes of the user;
executing the query against a database of help articles storing the plurality of available help articles; and
wherein executing the query causes performance of the steps of: identifying, performing the comparison, and selecting;
wherein the plurality of available help articles are in the database of help articles;
receiving results of the query, wherein the results include the one or more selected help articles;
wherein displaying information from the one or more selected help articles comprises displaying information from the one or more selected help articles included in the query results.

8. The one or more non-transitory computer-readable media of claim 6, wherein the instructions further comprise instructions which, when executed by one or more processors, cause:

constructing a query that is based, at least in part, on one or more of:
   a locator string for the particular web page, or
   metadata from at least a portion, of the particular web page, that displays the particular content;
executing the query against a database of help articles storing the plurality of available help articles;
wherein executing the query causes performance of the steps of: identifying, performing the comparison, and selecting;
wherein the plurality of available help articles are in the database of help articles;
receiving results of the query indicating a results set of help articles;
removing, from the results set of help articles, one or more help articles that are associated with attribute metadata that comprises user profile attribute values that are different from said one or more attributes of the user, to produce filtered query results;
wherein displaying information from the one or more selected help articles further comprises displaying information from one or more help articles in the filtered query results.

9. The one or more non-transitory computer-readable media of claim 6, wherein:
   the value of a particular attribute of the one or more attributes of the user indicates a particular spoken language;
   the one or more selected help articles include a language-specific help article; and
   the attribute metadata of the language-specific help article includes a user profile attribute value, for the particular attribute, that indicates the particular spoken language.

10. The one or more non-transitory computer-readable media of claim 6, wherein:
   the value of a particular attribute of the one or more attributes of the user indicates a particular user role;
   the one or more selected help articles include a role-specific help article; and
   the attribute metadata of the role-specific help article includes a user profile attribute value, for the particular attribute, that indicates the particular user role.

* * * * *

UNITED STATES PATENT AND TRADEMARK OFFICE
CERTIFICATE OF CORRECTION

PATENT NO. : 9,665,649 B2
APPLICATION NO. : 14/586098
DATED : May 30, 2017
INVENTOR(S) : Murthy Adari et al.

Page 1 of 1

It is certified that error appears in the above-identified patent and that said Letters Patent is hereby corrected as shown below:

On the Title Page

Item (75) Inventors:
Please delete "Chadler" and insert --Chandler--.

Signed and Sealed this
Eighth Day of May, 2018

Andrei Iancu
*Director of the United States Patent and Trademark Office*